United States Patent
Dube et al.

(10) Patent No.: US 8,020,167 B2
(45) Date of Patent: Sep. 13, 2011

(54) SYSTEM AND METHOD FOR AUTOMATIC THROTTLING OF RESOURCES IN AN INFORMATION HANDLING SYSTEM CHASSIS

(75) Inventors: Shawn Joel Dube, Austin, TX (US); Timothy Lambert, Austin, TX (US); Ralph Johnson, Round Rock, TX (US); Bruce Wagner, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 800 days.

(21) Appl. No.: 12/115,271

(22) Filed: May 5, 2008

(65) Prior Publication Data

US 2009/0276776 A1 Nov. 5, 2009

(51) Int. Cl.
*G06F 1/32* (2006.01)

(52) U.S. Cl. .................. 718/104; 713/340; 713/320

(58) Field of Classification Search .................. 718/104; 713/320, 340
See application file for complete search history.

(56) References Cited

U.S. PATENT DOCUMENTS

| | | | | |
|---|---|---|---|---|
| 6,148,010 A * | 11/2000 | Sutton et al. | ................ | 370/536 |
| 6,948,082 B2 * | 9/2005 | Gschwind et al. | ............ | 713/320 |
| 7,512,824 B2 * | 3/2009 | Artman et al. | ................ | 713/340 |
| 7,577,862 B2 * | 8/2009 | McClendon et al. | ......... | 713/500 |
| 7,853,808 B2 * | 12/2010 | Kim et al. | ..................... | 713/300 |
| 2002/0147875 A1 * | 10/2002 | Singh et al. | ................... | 710/305 |
| 2003/0135615 A1 * | 7/2003 | Wyatt | ............................ | 709/225 |
| 2003/0217297 A1 * | 11/2003 | Gschwind et al. | ............ | 713/300 |
| 2005/0172157 A1 * | 8/2005 | Artman et al. | ................ | 713/300 |
| 2006/0041766 A1 * | 2/2006 | Adachi | ......................... | 713/322 |
| 2006/0161794 A1 | 7/2006 | Chiasson et al. | ............. | 713/300 |
| 2007/0118771 A1 | 5/2007 | Bolan et al. | ................... | 713/300 |
| 2007/0150757 A1 | 6/2007 | Alderguia et al. | ............ | 713/300 |
| 2007/0234090 A1 * | 10/2007 | Merkin et al. | ................ | 713/320 |
| 2007/0250722 A1 | 10/2007 | Montero et al. | .............. | 713/300 |
| 2008/0077817 A1 * | 3/2008 | Brundridge et al. | .......... | 713/340 |
| 2008/0313492 A1 * | 12/2008 | Hansen | ............................ | 714/5 |

* cited by examiner

*Primary Examiner* — Idriss N Alrobaye
(74) *Attorney, Agent, or Firm* — Baker Botts L.L.P.

(57) ABSTRACT

Systems and methods for automatic throttling of resources in an information handling system are disclosed. A method may include determining whether a first throttling condition exists, the first throttling condition existing when a chassis management controller fails to communicate a clock or synchronization signal to one or more devices in an information handling system chassis for a particular duration of time. The method may also include determining whether a second throttling condition exists, the second throttling condition existing when the chassis management controller fails to communicate data to one or more devices in the information system handling chassis. The method may further include throttling a resource in the information handling system chassis if at least one of the first throttling condition and the second throttling condition exists.

20 Claims, 1 Drawing Sheet

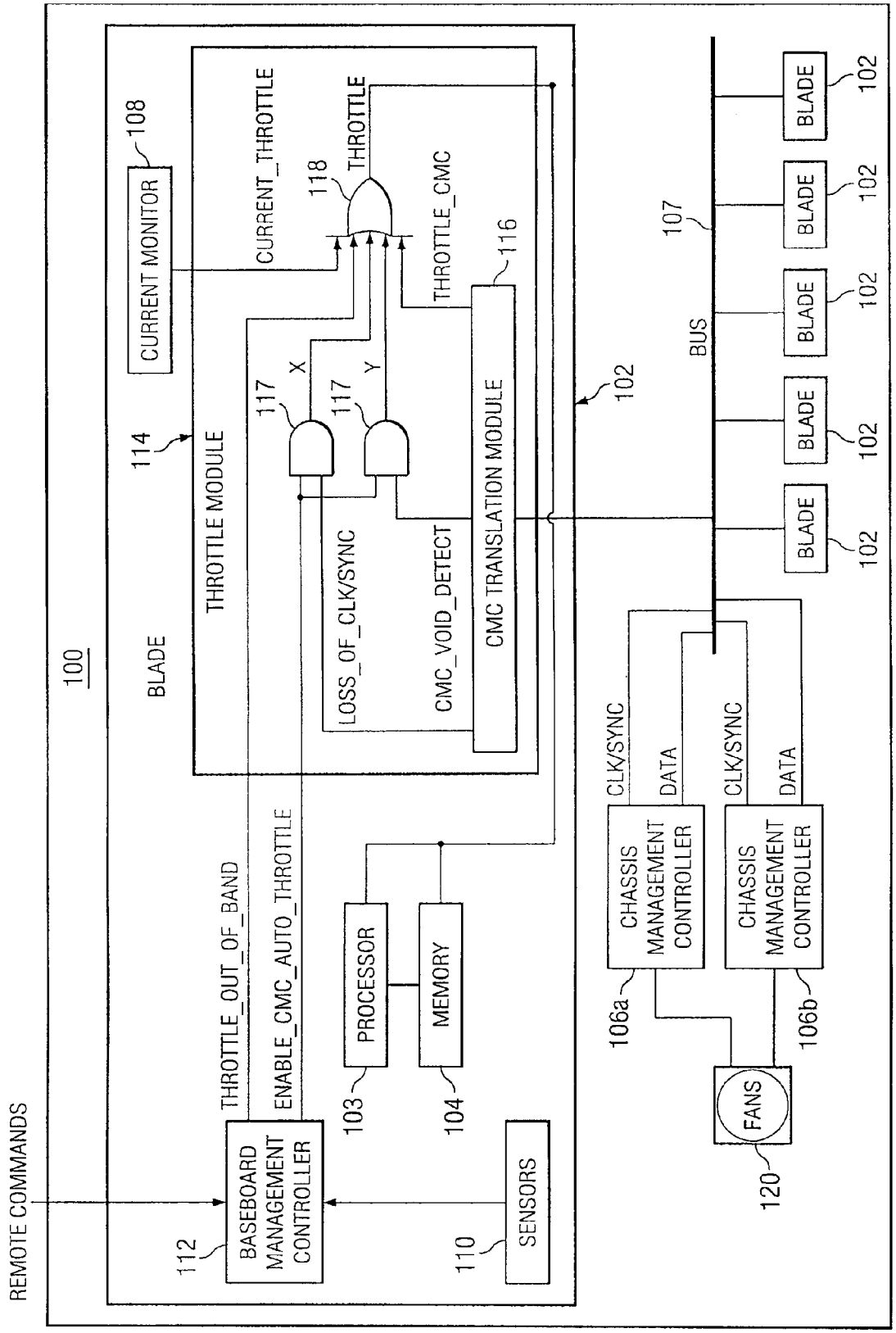

SYSTEM AND METHOD FOR AUTOMATIC THROTTLING OF RESOURCES IN AN INFORMATION HANDLING SYSTEM CHASSIS

TECHNICAL FIELD

The present disclosure relates in general to information handling system chassis management, and more particularly to a system and method for automatic throttling of resources in an information handling system chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain implementations, many individual self-contained information handling systems (e.g., server blades) may be placed together in a single chassis or a plurality of chasses. Such implementations allow for a high concentration of computing resources in a relatively small physical space, and are often used in applications that require a significant amount of computing resources (e.g., web servers, file servers, mail servers, etc.).

One disadvantage of high-density computing systems is that such systems often require large amounts of power. Such power requirements may lead to increased operational costs, as well as undesired heating of elements in the high-density computing system that could cause performance degradation. To combat this problem, modern high-density computing systems employ devices (e.g., chassis management controllers) to monitor and/or control power usage. Such power-management devices may permit certain resources to be "throttled" or placed in a low-power mode to allow such power to be allocated to other computing resources in the same chassis or another chassis.

One problem associated with the use of such chassis management controllers occur when the chassis management controller goes offline due to removal, firmware update, failover condition, or other reason, causing the chassis to become unmanaged. When this occurs, the chassis may "assume" that all processing and memory resources are operating at a maximum level, thus causing chassis cooling fans to spin up by default to ensure worst-case scenario cooling requirements. Such spinning up of fans may claim power that may otherwise be used by computing resources (e.g., processors and/or memories) in the same chassis and/or in other chasses. Reclaiming such power may permit more computing resources to be utilized.

SUMMARY

In accordance with the teachings of the present disclosure, disadvantages and problems associated with power management in an information handling system chassis have been substantially reduced or eliminated.

In accordance with one embodiment of the present disclosure, a method for automatic throttling of resources in an information handling system chassis is provided. The method may include determining whether a first throttling condition exists, the first throttling condition existing when a chassis management controller fails to communicate a clock or synchronization signal to one or more devices in an information handling system chassis for a particular duration of time. The method may also include determining whether a second throttling condition exists, the second throttling condition existing when the chassis management controller fails to communicate data to one or more devices in the information system handling chassis. The method may further include throttling a resource in the information handling system chassis if at least one of the first throttling condition and the second throttling condition exists.

In accordance with another embodiment of the present disclosure, a system for automatic throttling of resources in an information handling system chassis may include at least one resource and a throttle module communicatively coupled to the at least one resource. The throttle module may be operable to determine whether a first throttling condition exists, the first throttling condition existing when a chassis management controller fails to communicate a clock or synchronization signal to one or more devices in an information handling system chassis for a particular duration of time. The throttle module may also be operable to determine whether a second throttling condition exists, the second throttling condition existing when the chassis management controller fails to communicate data to one or more devices in the information system handling chassis. The throttle module may further be operable to communicate a signal to throttle a resource if at least one of the first throttling condition and the second throttling condition exists.

In accordance with a further embodiment of the present disclosure, an information handling system may include a processor, a memory communicatively coupled to the processor, and a throttle module communicatively coupled to the at least one resource. The throttle module may be operable to determine whether a first throttling condition exists, the first throttling condition existing when a chassis management controller fails to communicate a clock or synchronization signal to one or more devices in an information handling system chassis for a particular duration of time. The throttle module may also be operable to determine whether a second throttling condition exists, the second throttling condition existing when the chassis management controller fails to communicate data to one or more devices in the information system handling chassis. The throttle module may further be operable to communicate a signal to throttle at least one of the processor and the memory if at least one of the first throttling condition and the second throttling condition exists.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawing, in which like reference numbers indicate like features, and wherein the FIGURE illustrates a block diagram of an example information handling system chassis, in accordance with the present disclosure.

DETAILED DESCRIPTION

Preferred embodiments and their advantages are best understood by reference to the FIGURE, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers; and/or any combination of the foregoing.

The FIGURE illustrates a block diagram of an example information handling system chassis 100 (referred to herein as "chassis 100"), in accordance with the present disclosure. Chassis 100 may be an enclosure that serves as a container for various information handling components, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of server blades and/or other components (e.g., a "rack mount" system). As depicted in the FIGURE, chassis 100 may include blades 102, one or more chassis management controllers 106, and fans 120.

Each chassis management controller 106 may include any system, device or apparatus operable to monitor the power requirements of and control the operation of one or more components of chassis 100. As shown in the FIGURE, each chassis management controller 106 may generate a clock and/or synchronization signal (e.g., the signals labeled CLK/SYNC in the FIGURE) for blades 102 and/or other components of chassis 100. In addition, each chassis management controller 106 may also communicate data to blades 102 and/or other components of chassis 100 (as shown by the signal bus labeled as DATA in the FIGURE). In certain embodiments, such data may be communicated via a time division multiplexed (TDM) communication bus (e.g., bus 107). For example, an active chassis management controller 106 may determine that certain resources within chassis 100 may require more power than other resources, and may appropriately cause throttling of those resources requiring less power. As used herein, the term "resources" may be used to generally refer to blades 102, processors 103, and memories 104. As another example, an active chassis management controller 106 may receive a signal from another chassis indicating that the other chassis requires more power.

Accordingly, each chassis management controller 106 may throttle resources in chassis 100 to allow such power to be used by the other chassis. Each chassis management controller 106 may throttle such components (e.g., blades 102) by communicating appropriate signals to the components (e.g., via bus 107 referenced above). Additionally, each chassis management controller 106 may be configured to monitor parameters of chassis 100 (e.g., temperature, system stress, etc.) and control the operation of fans 120 (e.g., by communication via bus 107 referenced above) to cool resources in chassis 100 and/or throttle resources in response to the detection of such parameters (e.g., throttling in response to detection of a high temperature).

Each blade 102 may comprise an information handling system. In certain embodiments, one or more blades 102 may be a server (e.g., a blade server). In such embodiments, each blade 102 may be mounted in a suitable slot and/or interface of chassis 100. In the FIGURE, various components of one blade 102 are depicted. However, other blades 102 of chassis 100 may have similar or identical components. As depicted in the FIGURE, one or more blades 102 may include a processor 103, a memory 104, a current monitor 108, one or more sensors 110, a baseboard management controller 112, and a throttle module 114. Although the FIGURE depicts chassis 100 having six blades 102, chassis 100 may have any suitable number of blades 102.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of chassis 100. Although the FIGURE depicts that blade 102 comprises a single processor 103, blade 102 may include any suitable number of processors 103.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to blade 102 and/or chassis 100 is turned off. Although the FIGURE depicts memory 104 as a component integral to blade 102, one or more memories 104 may reside external to blade 102.

Current monitor 108 may include any system, device or apparatus configured to monitor and/or detect the current being used by chassis 100, blade 102 and/or individual components thereof. Current monitor 108 may also be configured to compare the monitored current against a current threshold and communicate a signal (e.g., the signal labeled CURRENT_THROTTLE in the FIGURE) indicating that the threshold has been exceeded (e.g., CURRENT_THROTTLE asserted when the threshold has been exceeded, unasserted otherwise). In certain embodiments, the communication of such signal may cause the throttling of blade 102 and/or one or more other resources in chassis 100, as described in greater detail below.

Sensors 110 may include any collection of one or more systems, devices, or apparatuses operable to sense one or more operating parameters associated with chassis 100, blade 102, and/or its individual components thereof. For example, sensors 110 may include a temperature sensor (e.g., an electronic thermostat or thermometer) to detect the temperature of the air in chassis 100 or the temperature of one or more of the components of chassis 100. Such sensed parameters may be communicated to baseboard management controller 112 of blade 102 for further processing.

Baseboard management controller 112 may be any system, device, and/or apparatus operable to control and/or manage blade 102 and/or its individual components. In certain embodiments, baseboard management controller 112 may be configured to provide an out-of-band management interface between chassis 100 and/or blade 102 and a remote system and that allows monitoring and management of chassis 100 and/or blade 102 from the remote system. In certain embodiments, baseboard management controller 112 may include a Dell Remote Access Controller (DRAC). Baseboard management controller 112 may allow a user remote to chassis 100 and/or blade 102 to manage chassis 100, blade 102, and/or and the components thereof as if the user were sitting at a local console. As shown in the FIGURE, baseboard management controller 112 may receive remote commands and signals from sensors 110. Based on at least these received signals, baseboard management controller 112 may output one or more control signals to other components of blade 102, including a signal (e.g., signal THROTTLE_OUT_OF_BAND as depicted in the FIGURE) indicating that blade 102 or one or more of its components is to be throttled (e.g., if a remote command was received to throttle) and/or if sensors 110 sense one or more parameters (e.g., a high temperature) indicating that blade 102 or one or more of its components should be throttled (e.g., THROTTLE_OUT_OF_BAND asserted when throttling is to occur, not asserted otherwise). Baseboard management controller 112 may also communicate a signal (e.g., signal ENABLE_CMC_AUTO_THROTTLE as depicted in the FIGURE) indicating whether blade 102 is operating in a low-power configuration (e.g., ENABLE_CMC_AUTO_THROTTLE asserted if not in a lower-power configuration, not asserted otherwise).

Throttle module 114 may be any system, device or apparatus operable to receive signals from current monitor 108, sensors 110, baseboard management controller 112, a chassis management controller 106 and/or other components of chassis 100, and based on at least such signals, determine whether or not blade 102 or one or more of its components is to be throttled. For example, in the particular embodiment depicted in the FIGURE, throttle module 114 may receive the CLK/SYNC signal and DATA from one of the chassis management controllers 106, along with the signals CURRENT_THROTTLE, THROTTLE_OUT_OF_BAND, and ENABLE_CMC_AUTO_THROTTLE discussed above, and determine whether to issue a signal to throttle one or more components of blade 102 based on at least such received signals. In certain embodiments, throttle module 114 may be implemented in whole or part with a programmable logic device (PLD) or a complex programmable logic device (CPLD).

As depicted in the FIGURE, throttle module 114 may include chassis management controller (CMC) translation module 116. CMC translation module 116 may receive the CLK/SYNC signal and DATA from an active management controller 106, and based on at least the CLK/SYNC signal and DATA from the active chassis management controller 106, determine whether DATA includes a command and/or signal to throttle one or more components of blade 102, and may communicate a signal (e.g., signal THROTTLE_CMC as shown in the FIGURE) indicating whether DATA includes a command and/or signal to throttle.

In addition, CMC translation module 116 may receive the CLK/SYNC signal and DATA from one or more management controllers 106, and based on at least the CLK/SYNC signal and DATA, determine whether all chassis management controllers 106 are offline (e.g., due to removal, firmware update, failover condition, or other reason). For example, if CMC translation module 116 detects that clock or synchronization signal CLK/SYNC is not received (which may indicate that management controller 106 is offline), CMC translation module 116 may communicate a signal indicating that no CLK/SYNC was detected (e.g., signal LOSS_OF_CLK/SYNC depicted in the FIGURE; asserted if no CLK/SYNC detected, otherwise not asserted).

In certain embodiments, a determination that no CLK/SYNC signal was detected may be made if no CLK/SYNC signal is available for a particular amount of time (e.g., 50 ms or more). Similarly, if CMC translation module 116 detects that chassis management controllers 106 are not communicating data (e.g., when DATA is communicated on bus 107, detection of a "void" or indication that chassis management controllers 106 are not participating on the bus), CMC translation module 116 may communicate a signal indicating that chassis management controllers 106 are not communicating data (e.g., signal CMC_VOID_DETECT depicted in the FIGURE; asserted if data not communicated, otherwise not asserted).

Thus, if either of signals LOSS_OF_CLK/SYNC or CMC_VOID_DETECT is asserted, chassis management controllers 106 may be offline, and one or more resources of chassis 100 may be throttled. However, there are certain scenarios in which, despite either of signals LOSS_OF_CLK/SYNC or CMC_VOID_DETECT being asserted, it may not be desirable to throttle blade 102 and/or resources in chassis 100. For example, if blade 102 is operating in a low-power configuration (e.g., as would be the case if the ENABLE_CMC_AUTO_THROTTLE signal is not asserted), blade 102 may already be operating in a low-power state and may not need throttling, or might suffer from excessive performance degradation if power provided to such resources is further reduced. Accordingly, throttle module 114 may include logic (e.g., AND gates 117) that may override the LOSS_OF_CLK/SYNC and/or CMC_VOID_DETECT signals in low-power configurations. Thus, the logical AND of LOSS_OF_CLK/SYNC and ENABLE_CMC_AUTO_THROTTLE may produce intermediate signal X, while the logical AND of CMC_VOID_DETECT and ENABLE_CMC_AUTO_THROTTLE may produce intermediate signal Y.

Throttle module 114 may also include logic (e.g., OR gate 118) that determines whether blade 102 is to be throttled, based on at least the signals CURRENT_THROTTLE, THROTTLE_OUT_OF_BAND, and THROTTLE_CMC discussed above, along with the intermediate signals X and Y discussed above. The logical OR of the signals X, Y, CURRENT_THROTTLE, THROTTLE_OUT_OF_BAND, and THROTTLE_CMC may produce another signal (e.g., signal THROTTLE shown in the FIGURE) indicative of whether blade 102 is to be throttled (e.g., THROTTLE asserted if throttling to occur, otherwise not asserted).

Fans 120 may include one or more mechanical or electromechanical fan used for cooling purposes. In certain embodiments, fans 120 may draw cool air into chassis 100 from the outside, expel warm air from inside chassis 100, and/or move air across a heatsink to cool one or more particular components of chassis 100.

Using the methods and systems disclosed herein, problems associated conventional approaches to managing power consumption in an information handling system chassis have been reduced or eliminated. For example, because the methods and systems disclosed may allow for resources to be placed in a throttled state upon detecting that a chassis is without an online management controller, chasses may be provided in which fans do not enter an assumed worst-case scenario when a chassis becomes unmanaged.

Although the present disclosure has been described in detail, it should be understood that various changes, substitutions, and alterations can be made hereto without departing from the spirit and the scope of the invention as defined by the appended claims.

What is claimed is:

1. A method for automatic throttling of resources in an information handling system chassis, comprising:
   determining whether a first throttling condition exists, the first throttling condition existing when a chassis management controller fails to communicate a clock or synchronization signal to one or more devices in an information handling system chassis for a particular duration of time;
   determining whether a second throttling condition exists, the second throttling condition existing when the chassis management controller fails to communicate data to one or more devices in the information system handling chassis;
   determining whether a third throttling condition exists, the third throttling condition existing when the resource is not in a low-power configuration;
   determining whether a fourth throttling condition exists, the fourth throttling condition existing when an out-of-band command has been received to throttle the resource; and
   throttling a resource in the information handling system chassis if at least one of the first throttling condition and the second throttling condition exists.

2. A method according to claim 1, further comprising:
   throttling the resource if the third throttling condition exists and at least one of the first throttling condition and the second throttling condition exists.

3. A method according to claim 1, further comprising:
   throttling the resource in the information handling system chassis if at least one of the first throttling condition, the second throttling condition, and the fourth throttling condition exists.

4. A method according to claim 1, further comprising:
   determining whether a fifth throttling condition exists, the fifth throttling condition existing when an electric current in the information handling system chassis has exceeded a predetermined threshold; and
   throttling the resource in the information handling system chassis if at least one of the first throttling condition, the second throttling condition, and the fifth throttling condition exists.

5. A method according to claim 1, further comprising:
   determining whether a sixth throttling condition exists, the sixth throttling condition existing when a command has been communicated by the chassis management controller to throttle the resource; and
   throttling the resource if at least one of the first throttling condition, the second throttling condition, and the sixth throttling condition exists.

6. A method according to claim 1, wherein the resource includes a host, a processor, or a memory.

7. A method according to claim 1, wherein at least one of determining whether the first throttling condition exists and determining whether the second throttling condition exists includes monitoring a time division multiplexed (TDM) bus.

8. A system for automatic throttling of resources in an information handling system chassis, comprising: at least one resource;
   a throttle module communicatively coupled to at least one resource, the throttle module operable to:
   determine whether a first throttling condition exists, the first throttling condition existing when a chassis management controller fails to communicate a clock or synchronization signal to one or more devices in an information handling system chassis for a particular duration of time;
   determine whether a second throttling condition exists, the second throttling condition existing when the chassis management controller fails to communicate data to one or more devices in the information system handling chassis;
   determine whether a third throttling condition exists, the third throttling condition existing when the resource is not in a low-power configuration;
   determine whether a fourth throttling condition exists, the fourth throttling condition existing when an out-of-band command has been received to throttle the resource; and
   communicate a signal to throttle a resource if at least one of the first throttling condition and the second throttling condition exists.

9. A system according to claim 8, the throttle module further configured to:
   communicate a signal to throttle the at least one resource if the third throttling condition exists and at least one of the first throttling condition and the second throttling condition exists.

10. A system according to claim 8, the throttle module further configured to:
    communicate the signal to throttle the resource if at least one of the first throttling condition, the second throttling condition, and the fourth throttling condition exists.

11. A system according to claim 8, the throttle module further configured to:
    determine whether a fifth throttling condition exists, the fifth throttling condition existing when an electric current in the information handling system chassis has exceeded a predetermined threshold; and
    communicate the signal to throttle the resource if at least one of the first throttling condition, the second throttling condition, and the fifth throttling condition exists.

12. A system according to claim 8, the throttle module further configured to:
    determine whether a sixth throttling condition exists, the sixth throttling condition existing when a command has been communicated by the chassis management controller to throttle the resource; and communicate the signal to throttle the resource if at least one of the first throttling condition, the second throttling condition, and the sixth throttling condition exists.

13. A system according to claim 8, wherein the resource includes a host, a processor, or a memory.

14. A system according to claim 8, the throttle module further configured to determine whether the first throttling condition exists and determine whether the second throttling condition exists by monitoring a time division multiplexed (TDM) bus communicatively coupled to the throttle module.

15. An information handling system, comprising:
   a processor;
   a memory communicatively coupled to the processor; and
   a throttle module communicatively coupled to at least one of the processor and the memory, the throttle module operable to:
   determine whether a first throttling condition exists, the first throttling condition existing when a chassis management controller fails to communicate a clock or synchronization signal to one or more devices in an information handling system chassis for a particular duration of time;
   determine whether a second throttling condition exists, the second throttling condition existing when the chassis management controller fails to communicate data to one or more devices in the information system handling chassis;
   determine whether a third throttling condition exists, the third throttling condition existing when the information handling system is not in a low-power configuration;
   determine whether a fourth throttling condition exists, the fourth throttling condition existing when an out-of-band command has been received to throttle the information handling system; and
   communicate a signal to throttle at least one of the processor and the memory if at least one of the first throttling condition and the second throttling condition exists.

16. An information handling system according to claim 15, the throttle module further configured to:
   communicate the signal to throttle at least one of the processor and the memory if the third throttling condition exists and at least one of the first throttling condition and the second throttling condition exists.

17. An information handling system according to claim 15, the throttle module further configured to:
   communicate the signal to throttle at least one of the processor and the memory if at least one of the first throttling condition, the second throttling condition, and the fourth throttling condition exists.

18. An information handling system according to claim 15, the throttle module further configured to:
   determine whether a fifth throttling condition exists, the fifth throttling condition existing when an electric current in the information handling system chassis has exceeded a predetermined threshold; and
   communicate the signal to throttle at least one of the processor and the memory if at least one of the first throttling condition, the second throttling condition, and the fifth throttling condition exists.

19. An information handling system according to claim 15, the throttle module further configured to:
   determine whether a sixth throttling condition exists, the sixth throttling condition existing when a command has been communicated by the chassis management controller to throttle the information handling system; and
   communicate the signal to throttle at least one of the processor and the memory if at least one of the first throttling condition, the second throttling condition, and the sixth throttling condition exists.

20. An information handling system according to claim 15, the throttle module further configured to determine whether the first throttling condition exists and determining whether the second throttling condition exists by monitoring a time division multiplexed (TDM) bus communicatively coupled to the throttle module.

* * * * *